March 5, 1929. E. J. LEVY Re. 17,228
THERMOSTAT
Original Filed July 15, 1926
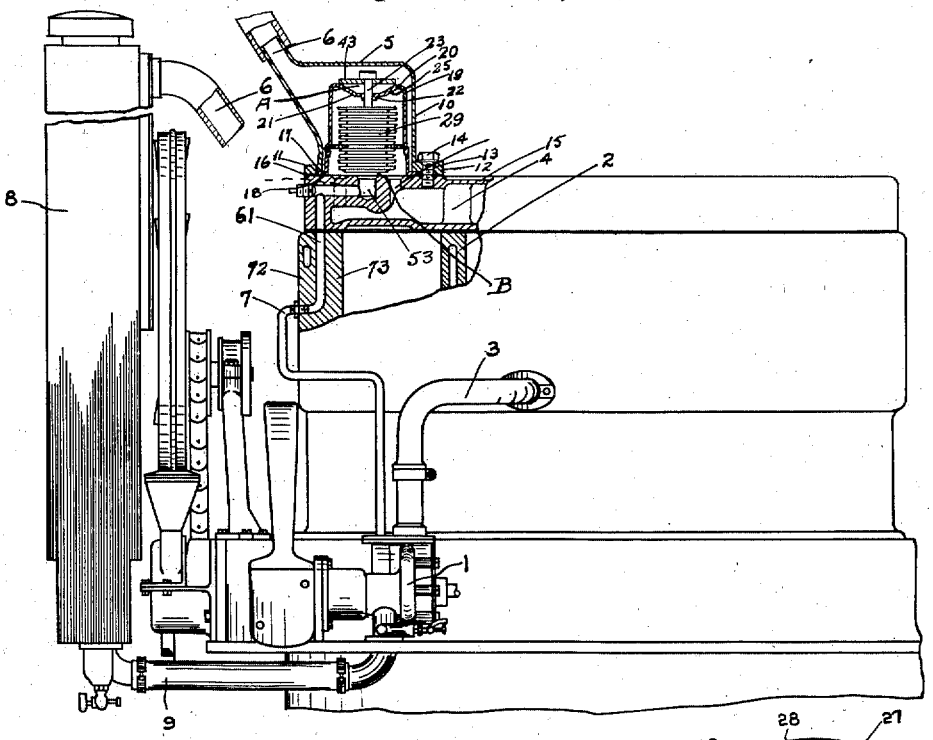
Fig. 1.
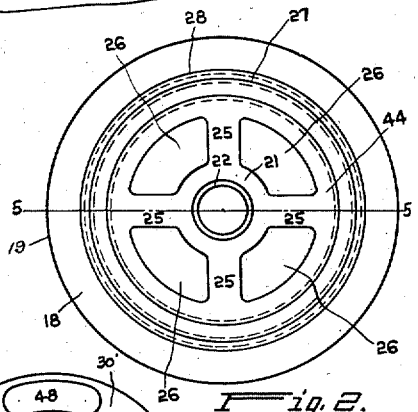
Fig. 2.
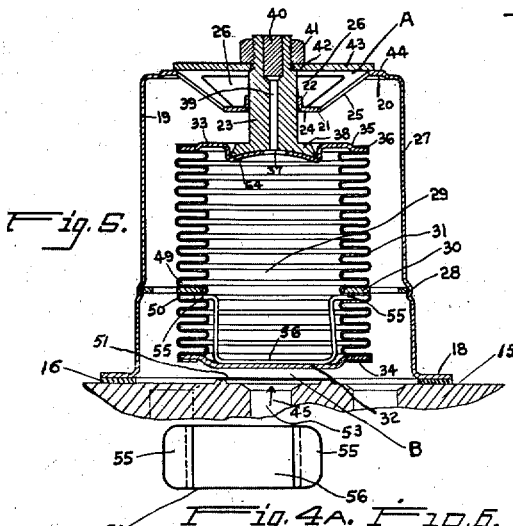
Fig. 5.
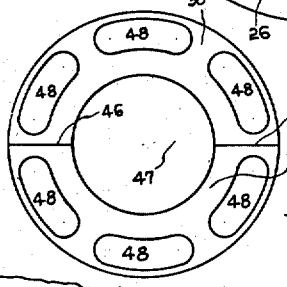
Fig. 3.
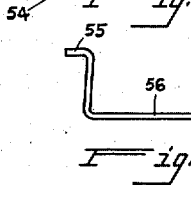
Fig. 4A.
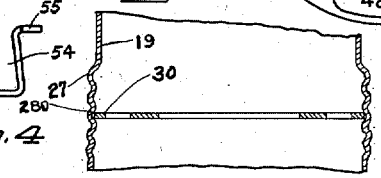
Fig. 5.
Fig. 4
INVENTOR
Edward J. Levy
BY
Frank M. Slough
His ATTORNEY Reissued Mar. 5, 1929. Re. 17,228

UNITED STATES PATENT OFFICE.

EDWARD J. LEVY, OF CLEVELAND, OHIO, ASSIGNOR TO THE BISHOP & BABCOCK MANUFACTURING COMPANY, OF CLEVELAND, OHIO, A CORPORATION OF OHIO.

THERMOSTAT.

Original No. 1,644,533, dated October 4, 1927, Serial No. 122,540, filed July 15, 1926. Application for reissue filed September 26, 1928. Serial No. 308,568.

My invention relates to thermostats and relates particularly to a thermostatic valve mechanism and a fluid system comprising such a thermostatic valve mechanism.

An object of my invention is to provide a cooling system with improved means for controlling the temperature of the cooling medium and for regulating its circulation.

Another object of my invention is to regulate the temperature of a cooling fluid by controlling the relative amounts of flow of such fluid in one or the other of a pair of fluid conduits.

Another object of my invention is to provide a unitary apparatus adapted to be installed in a cooling system, such as that of an internal combustion engine, to efficiently regulate the temperature of the cooling medium employed.

Other objects of my invention and the invention itself will appear from the following description, in which reference will be had to the accompanying drawings forming a part of this specification and which relate particularly to an embodiment of my invention.

Referring to the drawings:

Fig. 1 is a sectional view of a portion of an automotive engine, and a thermostat and controlled valve mechanism therefor, embodying my invention, taken on the longitudinal medial line of the thermostat, certain few parts being shown in elevation;

Fig. 2 is a plan view of the thermostat casing of Fig. 1;

Fig. 3 is a plan of a split ring employed in the said embodiment;

Fig. 4 is a view in side elevation of a stop element employed in the said embodiment, while Fig. 4ª is a plan view of the same;

Fig. 5 is a vertical medial sectional view taken on the line 5—5 of Fig. 2 of the thermostat employed in the foregoing figures; and Fig. 6 shows a modified form of container.

Referring now to the different figures of drawing in all of which like parts are designated by like reference characters, at 1, I show a fluid circulating pump, such as a water pump employed in internal combustion engine cooling systems, and at 2, I show a portion of the water jacket of the internal combustion engine which receives water or other fluid through an intake conduit 3, and from which it is discharged by a discharge conduit 4.

At 5, I show a thermostat valve mechanism housing, to the interior of which water is admitted from the conduit 4 and discharged therefrom through thermostatically controllable valve openings to conduits 6 and 7, the conduit 6 passing away to the radiator 8 from whence, by a return conduit 9, it again is received by the pump 1. Water is also discharged from the thermostat into a conduit 7 leading to the conduit 9 at the approach side of the pump 1.

The conduit 7 is commonly known as a bypass conduit and, in the embodiment of my invention herein illustrated, comprises a duct 61 provided within the walls 72 and 73 of the internal combustion engine, and is adapted to conduct varying amounts of cooling fluid directly from the thermostat at the cooling fluid discharge port of the engine water jacket to the approach side of the pump 1 and without being exposed to any considerable cooling agency. On the other hand, that portion of the cooling fluid which passes from the thermostat through the radiator 8 before being returned to the pump 1 is cooled by being exposed to the cooling influence of air passed over the surfaces of the radiator.

My invention, therefore, relates to that type of internal combustion engine cooling system, wherein the heat of the cooling fluid passed through the water jacket of the engine has its temperature regulated by the use of thermostatically controlled valves varying the amount of the cooling fluid passing through the radiator to regulate the cooling effect thereof upon the entire body of water in the cooling circulating system. Such systems being well known, one such system being illustrated in the patent to H. D. Church No. 1,398,361, dated November 29, 1921, to which reference may be had as illustrating generally the prior art efforts along the general line of my invention.

Some outstanding differences between the present construction and that of the prior art, as exemplified by the above patent, are:

First, that in applicant's construction the thermostatic unit, comprising the thermostat, valves and supporting shell therefor, is removable as a unit and capable of being installed as a unit in the cooling system of the internal combustion engine.

Second, the thermostatic mechanism of applicant's invention is of novel, highly efficient, compact design not subject to derangement of parts and capable of easy replacement.

Third, the thermostatic mechanism is capable of being mounted directly on the head of the engine, within the walls of which the by-pass conduit is provided and the inlet and by-pass outlet ports of the engine are in the same horizontal plane of the attaching face of the thermostatic mechanism casing whereby such ports may be readily brought in alignment with cooperating ports of the thermostatic mechanism.

In applicant's thermostatic mechanism, the timing of the valve functions of the branched flows leading from the valves controlling the radiator water and by-pass water flows may be advantageously predetermined for most efficient operation of the system.

In applicant's construction, in Fig. 1, I show a conduit element 10 having a base flange 11 with lateral extensions 12 bored at 13 for the reception of securing bolts 14, which are adapted to bolt the conduit element by its base flange to the engine head 15, a suitable gasket 16 being interposed for fluid sealing purposes. The base flange is annularly counter bored at 17 sufficiently to receive the peripheral flange 18 of a thermostat supporting shell 19, generally of inverted cup shaped form and having an end wall 20 with a reentrant portion 21. The reentrant end wall comprises a depressed central portion 24 with an inner and upstanding annular bearing flange 22 for the cylindrical valve rod 23 to guide the same a plurality of spaced arms 25 supporting the said central portion openings 26 between the arms, being provided for the flow of cooling water from the interior of the shell 19 to its exterior through the shell end wall. The side walls 27 of the shell are impervious and preferably comprise, at a predetermined point, as at 28, an outwardly expanded annular bead.

A thermostatic bellows element 29 is housed within the shell 19, being supported by a split ring 30, whose peripheral portions are seated within the concavity of the bead and inner surfaces, and also positioned in part by the valve rod 23.

The thermostat bellows of my invention comprises, preferably, a tube 29 having corrugated flexible side walls 31 and stiffened end walls 32 and 33, the end wall 32 comprising a dished plate with its rim flange 34 making sealed engagement with the lowermost convolution of the bellows side wall, and the uppermost end wall 33 being in the form of a disk having a depressed central portion 64 and lateral peripheral flanges 35 inserted within and making fluid-tight connection with the uppermost convolution 36 of the bellows side wall. The central portion of the end wall 33 is preferably bowed upwardly and pierced at 37.

Seated within the recess formed by the depression of the central portion of the end wall 33 is the flanged lower end 38 of the valve rod 23. The valve rod 23 comprises an axial bore 39 thru which thermally expansible fluid contained within the bellows for expanding the same may be introduced. The bore 39, however, is subsequently closed by a plug 40 tightly inserted in the upper enlarged end of the bore. A cap 41 screw threaded onto the upper threaded end of the rod 23 is adapted to clamp, between its lower surface and the upper surface of the rod shoulder 42, a valve disk 43. The peripheral portions of the valve disk 43 are adapted to engage the annular plane valve seat 44, and when seated thereupon the valve, comprising the disk and its seat, will effect a closure to the flow of water passing in the direction of the arrow 45 through the upward neck of the conduit element 10 and thence to the radiator 8.

As illustrated, particularly in Fig. 3, the split ring shown at 30, Fig. 1, comprises a half ring-section 30′, and a complementary half ring-section 30″, the two being placed together, as illustrated in Fig. 3, complete an annular ring diametrically split along the line 46, having a relatively large central opening 47, the ring being of sheet metal and apertured at intervals as shown at 48.

The split ring sections are placed about the side walls of the bellows at opposite sides thereof and intermediate a pair of bellows convolutions 49 and 50, and forced between such convolutions until their diametrical edges are brought closely together and with the bellows inserted within the enclosing shell 19, the peripheral portions of the split ring-sections being received within the annular concave surface on the inner wall of the shell at the annular bead 28 thereof. A good support for the bellows is thus effected, supporting the bellows on the side walls of the shell, at the same time permitting the flow of water or other cooling fluid past the bellows through the shell and into contact with all exterior surfaces of the bellows, and at the same time depending upon the particular convolutions 49 and 50 between which the split ring 30 is received, effecting a predetermination of the relative normal positions of the end plate 32, which acts as a valve element, and its valve seat 51.

The valve element 32 is adapted to approach and close the by-pass valve port 53 communicating with the by-pass conduit 61 which leads through the conduit 7 to the intake side of the pump 1. A stop element, comprising a bent metallic strip formed as shown in Figs. 4 and 4ª, is illustrated at 54 and comprises a pair of laterally extending end flanges 55 projected within the bellows convolution 50 and an intermediate stop portion 56 preferably adapted to normally contact with the inner surface of the bellows.

The bellows having been previously charged with any suitable thermo-sensitive liquid or vapor is first assembled within its shell 19, as illustrated and above described, and the shell is then inserted within the conduit element 10 of the automotive engine cooling system with its rim flange 18 rigidly secured below the base flange 11 of the said conduit element, the adjustment of the valves being preferably so made that the valve, comprising the disk 43 and seat 44, and which herein we may call the valve A, will normally be closed.

The valve, comprising the valve element 32 and seat 51, and which herein we may call the valve B, will normally be open to a maximum extent; and the adjustments being moreover preferably so made that upon operation of the engine and the cooling fluid therefor being gradually heated, will at first be communicated to the interior of the shell and passed therefrom through the valve opening B through the by-pass conduit comprising sections 61 and 7. Returning to the pump, from thence it circulates through the engine water jacket again to the thermostat shell, the operation being continuous until the thermostat 29, by heat communicated through its walls to the thermo-sensitive liquid or vapor contained therein, will expand longitudinally.

The preferred adjustment of the parts is one which will effect the initial stages of valve opening of the valve A at about the same time the valve B has practically reached its closed position. Under such a condition of adjustment, the engine will rapidly attain its desired operating temperature, since there will be little or no cooling of the cooling fluid accomplished so long as little or none of the fluid is passed through the valve A in the direction of the arrow 45 through the radiator 8. Until this is accomplished, the rise in temperature will be rapid, but subsequently the valve A is opened and substantially simultaneously with the closure of the valve A, and the closure of the valve B will effect an increased lifting effort upon the valve disk 43 which is exerted by cooling fluid. The valve disk will be moved upwardly by the resultant combined effort of the expanded thermostat element 29 assisted by the lifting effort of the water pressure exerted on the under side of the valve disk 43.

In this way I secure the advantage of accomplishing an efficient operation of both valves with a single thermostat of the bellows type. Water being passed through the radiator upon a predetermined heating of the engine, in sufficient quantity, will be cooled and will effect a cooling of the engine and resultant contraction of the thermostat tending to restore the thermostat toward normal valve operating position, whereupon the first described heating and resultant valve operation will reoccur, the periods of heating and cooling being within narrow limits of time and degree to the end that a substantially constant temperature of cooling fluid is effected.

In Fig. 6 I show a modification of my invention wherein the side walls 27 of the casing 19 are annularly corrugated for a portion of their length so that the sections of the split ring 18 may be adjustable axially of the shell 19 fitting into any desired one of the annular recesses so provided in the side walls. This arrangement permits variation in relative movement of the two ends of the thermostat by varying the point of application of the ring to the thermostat supported by it.

Having thus described my invention in a preferred embodiment, I am aware that numerous and extensive departures may be made from the embodiment of my invention herein illustrated and described but without departing from the spirit of my invention.

I claim:

1. In a thermostatic mechanism of the class described, in combination with an internal combustion engine and a cooling system therefor, comprising a radiator, a cooling fluid containing jacket encasing the internal combustion engine cylinders and a by-pass conduit adapted to shunt fluid from the radiator, of a thermostat controlling the flow through the radiator and also the said by-pass conduit, said thermostat being immersible in fluid from the jacket and expansive responsive to an excess of temperature from a normal temperature, a pair of valves operable thereby, one being disposed in the path of the flow to the radiator, the second disposed in the by-pass conduit, the first being effective to increase the flow through the radiator and the second valve being effective to decrease the flow through the by-pass upon such increased temperature, opposite ends of the thermostat effecting the above operation of the respective valves.

2. In a thermostatic mechanism of the class described, in combination with an internal combustion engine and a cooling system therefor, comprising a radiator, a cooling fluid containing jacket encasing the internal combustion engine cylinder and a by-pass conduit adapted to shunt fluid from the radiator, of a thermostat controlling the flow through the radiator and also the said by-pass conduit, said thermostat being immersible in fluid from the jacket and expansive responsive to an excess of temperature from a normal temperature, a pair of valves operable thereby, one being disposed in the path of the flow to the radiator, the second disposed in the by-pass conduit, the first valve being effective to increase the flow through the radiator and the second valve being effective to decrease the flow through the by-pass upon such increased temperature, opposite ends of the thermostat effecting the above operation of the respective valves, said thermostat being fixedly supported intermediate its ends.

3. In a thermostatic mechanism of the class described, in combination with an internal combustion engine and a cooling system therefor, comprising a radiator, a cooling fluid containing jacket encasing the internal combustion engine cylinders and a by-pass conduit adapted to shunt fluid from the radiator, of a thermostat of tubular form having corrugated flexible side walls and closing end walls, and interiorly charged with a thermosensitive fluid controlling the flow through the radiator and also the said by-pass conduit, said thermostat being immersible in fluid from the jacket and expansive responsive to an excess of temperature from a normal temperature, a pair of valves operable thereby, one being disposed in the path of the flow to the radiator, the second disposed in the by-pass conduit, the first valve being effective to increase the flow through the radiator and the second valve being effective to decrease the flow through the by-pass upon such increased temperature, opposite ends of the thermostat effecting the above operation of the respective valves.

4. In a thermostatic mechanism of the class described, in combination with an internal combustion engine and a cooling system therefor, comprising a radiator, a cooling fluid containing jacket encasing the internal combustion engine cylinders and a by-pass conduit adapted to shunt fluid from the radiator, of a thermostat of tubular form having corrugated flexible side walls and closing end walls, and interiorly charged with a thermosensitive fluid controlling the flow through the radiator and also the said by-pass conduit, said thermostat being immersible in fluid from the jacket and expansive responsive to an excess of temperature from a normal temperature, a pair of valves operable thereby, one being disposed in the path of the flow of the radiator, the second disposed in the by-pass conduit, the first valve being effective to increase the flow through the radiator and the second valve being effective to decrease the flow through the by-pass upon such increased temperature, opposite ends of the thermostat effecting the above operation of the respective valves, said thermostat being fixedly supported intermediate its ends, a tubular casing for the thermostat adapted to receive fluid from the jacket, an intraperipheral non-central portion of the casing and an upper end wall thereof having valve ports therethrough, a movable valve element responsive to longitudinal movements of an end wall of the thermostat to open and close the passage through the port to increase or decrease the flow to the radiator, and a centrally disposed valve element responsive to movements of the other thermostat end wall to close or open an opposing valve port from a wall of the jacket to which the thermostat casing may be attached at its open end.

5. In a thermostat for controlling the flow of cooling fluid in an internal combustion engine, the combination with a metallic thermostatic element having a pair of oppositely disposed end walls and flexible corrugated side walls, and adapted to contain a thermosensitive fluid, of a tubular casing for the element having impervious side walls and a ported end wall, a valve element for opening and closing the port, the other end of the casing being provided with peripheral means of attachment to a wall of the engine cooling jacket and adapted to receive heated fluid therefrom and to exhaust such fluid through the said port, a second valve element adapted to open and close the port opening in such jacket wall, each of said valves being responsive to movements of a different one of the thermostat end walls, the first valve being responsive to an expansive movement of its thermostat end wall to open its controlled port, the other valve element being responsive to an expansive movement of its thermostat end wall to close its control port, said last named port adapted to by-pass cooling fluid around the automotive engine fluid cooling radiator.

6. In a thermostat for controlling the flow of cooling fluid in an internal combustion engine, the combination with a metallic thermostatic element having a pair of oppositely disposed end walls and flexible corrugated side walls, adapted to contain a thermo-sensitive fluid, of a tubular casing for the element having impervious side walls and a ported end wall, a valve element for opening and closing the port, the other end of the casing being provided with peripheral means of attachment to a wall of the engine cooling jacket and adapted to receive heated fluid therefrom and to exhaust such fluid through the said port, a second valve element adapted to open and close a port opening in such jacket wall, each of said valves being responsive to movements of a different one of the thermostat end walls, the first valve being responsive to an expansive movement of its thermostat end wall to open its controlled port, the other valve element being responsive to an expansive movement of its thermostat end wall to close its control port, said last named port adapted to by-pass cooling fluid around the automotive engine fluid cooling radiator, and means for anchoring the thermostat relative to the casing at an intermediate portion of the thermostat side walls.

7. In a thermostat adaptable for attachment to a cooling jacket wall of an automotive engine, comprising a tubular casing, a thermostatic element contained therein, said casing having a ported wall adapted to be disposed remote from the jacket and an outwardly flanged end wall attachable thereto, a valve element overhanging the outer surface of the port and having a stem projected therethrough to the interior of the casing and attached therein to an end wall of the thermostat element, a second valve element disposed approximately in the plane of the casing flange and rigidly secured to an opposite end of the thermostatic element, the side walls of the casing being impervious and adapted to convey fluid from the engine jacket passing through the said port towards the engine radiator, said last mentioned valve element adapted to control a by-passed flow passed around said engine radiator, heated fluid being receivable from the engine jacket into the casing through the flanged end thereof.

8. In a thermostat adaptable for attachment to a cooling jacket wall of an automotive engine, comprising a tubular casing, a thermostatic element contained therein, said casing having a ported wall adapted to be disposed remote from the jacket and an outwardly flanged end wall attachable thereto, a valve element overhanging the outer surface of the port and having a stem projected therethrough to the interior of the casing and attached therein to an end wall of the thermostat element, a second valve element disposed approximately in the plane of the casing flange and rigidly secured to an opposite end of the thermostatic element, the side walls of the casing being impervious and adapted to convey fluid from the engine jacket passing through the said port towards the engine radiator, said last mentioned valve element adapted to control a by-passed flow passed around said engine radiator, heated fluid being receivable from the engine jacket into the casing thru the flanged end thereof, and means for rigidly supporting a portion of the side walls of the thermostat intermediate the thermostat end walls upon the casing.

9. In a thermostat adaptable for attachment to a cooling jacket wall of an automotive engine, comprising a tubular casing, a thermostatic element contained therein, said casing having a ported wall adapted to be disposed remote from the jacket and an outwardly flanged end wall attachable thereto, a valve element overhanging the outer surface of the port and having a stem projected therethrough to the interior of the casing and attached therein to an end wall of the thermostat element, a second valve element disposed approximately in the plane of the casing flange and rigidly secured to an opposite end of the thermostatic element, the side walls of the casing being impervious and adapted to convey fluid from the engine jacket passing through the said port towards the engine radiator, said last mentioned valve element adapted to control a by-passed flow passed around said engine radiator, heated fluid being receivable from the engine jacket into the casing through the flanged end thereof, and means for rigidly supporting a portion of the side walls of the thermostat intermediate the thermostat end walls upon the casing, said means comprising a segmental ring, the periphery thereof being inserted within an annular concavity contained within the outer walls of the casing, said ring segments being perforated longitudinally.

10. In a thermostat adaptable for attachment to a cooling jacket wall of an automotive engine, comprising a tubular casing adapted for attachment by an end to the jacket wall, a thermostatic element contained in the casing, the said jacket wall having a valve opening and a second adjacent opening therethrough, a valve adapted for movement responsive to an expansive movement of the thermostat to close the valve opening, said adjacent opening adapted to communicate heated cooling water from the engine jacket to the space within the casing surrounding the thermostat, and a port for the casing for the discharge of water admitted to the interior of the casing through said adjacent opening.

11. In a thermostat adaptable for attachment to a cooling jacket wall of an automotive engine, comprising a tubular casing adapted for attachment by an end to the jacket wall, a thermostatic element contained in the casing, the said jacket wall having a valve opening and a second adjacent opening therethrough, a valve adapted for movement responsive to an expansive movement of the thermostat to close the valve opening, said adjacent opening adapted to communicate heated cooling water from the engine jacket to the space within the casing surrounding the thermostat, and a port for the casing for the discharge of water admitted to the interior of the casing through said adjacent opening, a valve for said port movable to open the port responsive to expansive movements of the thermostat.

12. In a thermostat adaptable for attachment to a cooling jacket wall of an automotive engine, comprising a tubular casing adapted for attachment by an end to the jacket wall, a thermostatic element contained in the casing, the said jacket wall having a valve opening and a second adjacent opening therethrough, a valve adapted for movement responsive to an expansive movement of the thermostat to close the valve opening, said adjacent opening adapted to communicate heated, cooling water from the engine jacket to the space within the casing surrounding the thermostat, and a port for the casing for the discharge of water admitted to the interior of the casing through said adjacent opening, a valve for said port movable to open the port responsive to expansive movements of the thermostat, said thermostat comprising end walls and flexible corrugated side walls joining the end walls, one of said end walls communicating motion to the first said valve, the other end wall communicating motion to the second named valve.

13. In a thermostat adaptable for attachment to a cooling jacket wall of an automotive engine, comprising a tubular casing adapted for attachment by an end to the jacket wall, a thermostatic element contained in the casing, the said jacket wall having a valve opening and a second adjacent opening therethrough, a valve adapted for movement responsive to an expansive movement of the thermostat to close the valve opening, said adjacent opening adapted to communicate heated cooling water from the engine jacket to the space within the casing surrounding the thermostat, and a port for the casing for the discharge of water admitted to the interior of the casing through said adjacent opening, a valve for said port movable to open the port responsive to expansive movement of the thermostat, said thermostat comprising end walls and flexible corrugated side walls joining the end walls, one of said end walls communicating motion to the first said valve, the other end wall communicating motion to the second named valve, supporting means for the thermostatic element extending from the tubular side wall of the casing to the tubular corrugated side wall of the thermostatic element.

14. In a thermostat adaptable for attachment to a cooling jacket wall of an automotive engine, comprising a tubular casing adapted for attachment by an end to the jacket wall, a thermostatic element contained in the casing, the said jacket wall having a valve opening and a second adjacent opening therethrough, a valve adapted for movement responsive to an expansive movement of the thermostat to close the valve opening, said adjacent opening adapted to communicate heated cooling water from the engine jacket to the space within the casing surrounding the thermostat, and a port for the casing for the discharge of water admitted to the interior of the casing through said adjacent opening, a valve for said port movable to open the port responsive to expansive movements of the thermostat, said thermostat comprising end walls and flexible corrugated side walls joining the end walls, one of said end walls communicating motion to the first said valve, the other end wall communicating motion to the second named valve, supporting means for the thermostatic element extending from the tubular side wall of the casing to the tubular corrugated side wall of the thermostatic element, said supporting means comprising a split flattened apertured ring.

15. In a thermostat adaptable for attachment to a cooling jacket wall of an automotive engine, comprising a tubular casing, a thermostatic element contained therein, said casing having a ported wall adapted to be disposed remote from the jacket and an outwardly flanged end wall attachable thereto, a valve element overhanging the outer surface of the port and having a stem projected therethrough to the interior of the casing and attached therein to an end wall of the thermostat element, a second valve element disposed approximately in the plane of the casing flange and rigidly secured to an opposite end of the thermostatic element, the side walls of the casing being impervious and adapted to convey fluid from the engine jacket passing through the said port towards the engine radiator, said second valve element adapted to control a by-passed flow passed around said engine radiator, heated fluid being receivable from the engine jacket into the casing through the flanged end thereof, and means for rigidly supporting a portion of the side walls of the thermostat intermediate the thermostat end walls upon the casing, said means comprising a segmental ring, the periphery thereof being inserted within an annular concavity contained within the outer walls of the casing, said ring segments being perforated longitudinally, and a stop element disposed within the thermostatic element comprising an intermediate yoke portion and upwardly extending outwardly flanged arms, the arm flanges being rigidly secured to opposite side walls of the thermostatic element adjacent the thermostat supporting means, the intermediate portion being so disposed as to contact with the inner surface of the said thermostatic element opposite end when the thermostat is in relatively contracted condition.

16. A controlling mechanism comprising a container having a pair of end walls and interconnecting longitudinally expansible and collapsible side walls, said end walls adapted to be moved axially responsive to the effect of pressure of fluid in the container expanding the side walls, a pair of controlling means each individually operable by longitudinal movement of a different one of said end walls and means contacting an intermediate portion of the side wall to restrain movement of the contacted side wall portion, a housing for the container having side walls spaced from and enclosing the container side walls, said restraining means engageable with a portion of the housing opposite the contacted portion of the container.

17. A controlling mechanism comprising a container having a pair of end walls and interconnecting longitudinally expansible and collapsible side walls, said end walls adapted to be moved axially responsive to the effect of pressure of fluid in the container expanding the side walls, a pair of controlling means each individually operable by longitudinal movement of a different one of said end walls and means contacting an intermediate portion of the side wall to restrain movement of the contacted side wall portion, a housing for the container having side walls spaced from and enclosing the container side walls, said restraining means engageable with a portion of the housing opposite the contacted portion of the container, and comprising an annular ring split diametrically to facilitate insertion within the housing.

18. A controlling mechanism comprising a container having a pair of end walls and interconnecting longitudinally expansible and collapsible side walls, said end walls adapted to be moved axially responsive to the effect of pressure of fluid in the container expanding the side walls, a pair of controlling means each individually operable by longitudinal movement of a different one of said end walls and means contacting an intermediate portion of the side wall to restrain movement of the contacted side wall portion, a substantially cup shaped housing for the container having beaded side walls, said restraining means fitting between an annularly recessed container side wall portion and an oppositely recessed bead of the housing.

19. A controlling mechanism comprising a container having a pair of end walls and interconnecting longitudinally expansible and collapsible side walls, said end walls adapted to be moved axially responsive to the effect of pressure of fluid in the container expanding the side walls, a pair of controlling means each individually operable by longitudinal movement of a different one of said end walls and means contacting an intermediate portion of the side wall to restrain movement of the contacted side wall portion, and a housing for the container having side walls spaced from the container side walls, said container and housing side walls being oppositely beaded, said restraining means fitting within an oppositely disposed annular recess of the container and housing side walls.

20. A fluid pressure responsive valve comprising, a mounting plate therefor having a valve aperture therein, a valve adapted to close said aperture, an expansible and contractible thermostatic element having corrugated continuous longitudinally expansible side walls and an end wall disposed adjacent said valve, said end wall adapted to communicate motion to the valve, and supporting means rigidly securing the mounting plate and the element together, adapted to engage the thermostatic element intermediate its ends.

21. A fluid pressure responsive valve comprising a mounting plate therefor having a valve adapted to close said aperture, an expansible and contractible thermostatic element having corrugated longitudinally expansible side walls and an end wall disposed adjacent said valve, said end wall adapted to communicate motion to the valve when pressures are introduced into the element, and supporting means rigidly securing the mounting plate and the element together adapted to engage between a pair of corrugations of the said element to support the same.

22. A fluid pressure responsive valve comprising a mounting plate therefor having a valve aperture therein, a valve adapted to close said aperture, a valve stem for the valve, an expansible and contractible thermostatic element having corrugated continuous longitudinally expansible side walls and a relatively rigid end wall disposed adjacent said valve, said stem secured to said end wall and adapted to communicate motion to the valve, and supporting means comprising a cage rigidly securing the mounting plate and the element together adapted to engage between a pair of intermediate corrugations of the thermostatic element.

23. A fluid pressure responsive valve comprising a substantially tubular housing, an axially disposed valve port therein and a thermo-expansible element axially disposed in the housing, having tubular side walls of corrugated form defining a series of spaced annular grooves on the outer surface of the element, said element being anchored within the casing by means projecting from the casing to engage the corrugated side walls of the element intermediate the ends of the element, and a valve for said port operable by a relative movement of a longitudinally spaced portion of the element to the anchored portion thereof.

24. A fluid pressure responsive valve comprising a substantially tubular housing, an axially disposed valve port therein and a thermo-expansible element axially disposed in the housing, having tubular side walls of corrugated form defining a series of spaced annular grooves on the outer surface of the element, said element being anchored within the casing by means projecting from the casing to engage the corrugated side walls of the element intermediate the ends of the element, and a valve for said port operable by a relative movement of a longitudinally spaced portion of the element to the anchored portion thereof, and a second valve element operable by such relative movement of another longitudinally spaced portion of the element disposed on the opposite side of the said anchored surface.

25. A fluid pressure responsive valve comprising a cage, a valve plate secured at one end of the cage and having a valve opening therethrough, a thermo-expansive element having an end wall and tubular side walls of corrugated form defining a series of spaced annular grooves on the outer surface of the element longitudinally disposed within the cage, a valve for the plate opening operable by axial movement of said end wall, and means joining the cage and the corrugated side walls of the element intermediate its ends adapted to anchor the element with reference to the plate.

26. In a self-contained thermostat, adapted for controlling a flow of cooling fluid from the cooling jacket of an internal combustion engine cylinder to which it may be affixed, comprising a tubular casing comprising a tubular portion and a radial flange, a flanged tubular outlet element telescoped over said casing with its flange superposed over said casing flange, means to directly secure said casing and said outlet on to the jacket wall by their respective superposed flanges, a valve and thermostatic element supported by the casing, and means adapted to communicate movement from said element to said valve to move the valve to open and close a passage extending longitudinally through the casing communicating at one end directly with a port in the cooling jacket, and at its other end with the interior of the tubular outlet.

27. In a thermostat adapted for attachment directly to an automotive engine cylinder head cooling jacket having a top wall comprising a tubular casing having a radial flange, a thermostatic element supported thereby, said casing having a liquid passage therethrough, and adapted to be attached by its flange directly on the said top wall, a valve element supported by the casing adapted to be moved to close the passage, means adapted to communicate operative movement from said thermostatic element to said valve element, said casing comprising substantially impervious side walls and terminating in a discharge passage at its upper end, said jacket wall having an opening therethrough adapted to communicate cooling liquid from the jacket to the interior of the attached tubular casing through its flanged bottom end, and a tubular housing having a liquid discharging opening at its upper end, telescoped over and enclosing the casing, said housing having a bottom flange superposed over the bottom flange of the casing, and attached thereby to the jacket top wall.

In witness whereof I hereunto affix my signature this 8th day of September, 1928.

EDWARD J. LEVY.